United States Patent [19]

Hashimoto et al.

[11] Patent Number: 4,592,622
[45] Date of Patent: Jun. 3, 1986

[54] LIGHT-BEAM SCANNING APPARATUS

[75] Inventors: Akira Hashimoto, Hitachi; Susumu Saito, Hachioji; Akira Arimoto, Musashimurayama; Kenji Morita, Hachioji, all of Japan

[73] Assignees: Hitachi Koki Co., Ltd.; Hitachi Ltd., both of Tokyo, Japan

[21] Appl. No.: 578,210

[22] Filed: Feb. 8, 1984

[30] Foreign Application Priority Data

Mar. 23, 1983 [JP] Japan .................................. 58-47050

[51] Int. Cl.⁴ .............................................. G02F 1/00
[52] U.S. Cl. ..................................... 350/395; 350/6.8
[58] Field of Search ................ 350/6.5, 6.8, 164, 165, 350/166, 394, 395, 396, 486, 444, 387, 273, 377, 612, 616, 619

[56] References Cited

U.S. PATENT DOCUMENTS

| 4,093,350 | 6/1978 | Fisli | 350/616 |
| 4,202,597 | 5/1980 | Moore | 350/6.8 |
| 4,294,506 | 10/1981 | Hattori | 350/6.8 |
| 4,322,130 | 3/1982 | Ito et al. | 350/395 |

FOREIGN PATENT DOCUMENTS 0093921 11/1983 European Pat. Off. .

OTHER PUBLICATIONS

Journal of The Optical Society of America, vol. 72, No. 1, Jan. 1982, pp. 27–39.

Primary Examiner—John K. Corbin
Assistant Examiner—Loha Ben
Attorney, Agent, or Firm—Antonelli, Terry & Wands

[57] ABSTRACT

A light-beam scanning apparatus is disclosed in which a mirror surface of a metal having a characteristic that the reflectance of the mirror surface increases as the incident angle of light incident on the mirror surface is larger, is used as a reflecting surface, the optical thickness nd of a transparent protective film formed on the reflecting surface is made substantially equal to mλ/2 (where n, d, m and λ indicate the refractive index of the protective film, the thickness of the protective film, an integer, and the wavelength of the incident light, respectively), the incident light is linearly-polarized light, and the direction of vibration of the linearly-polarized light is inclined at an angle of about +40° to −40° to a direction perpendicular to the plane of incidence of the linearly-polarized light.

20 Claims, 10 Drawing Figures

LIGHT-BEAM SCANNING APPARATUS

The present invention relates to a light-beam scanning apparatus, and more particularly to a light-beam scanning apparatus suited to cause a linearly-polarized laser beam to perform a scanning operation.

As a conventional light beam deflector, vibrating or rotating mirrors are used in many applications.

They are made of a material such as glass or a metal adapted to its use. The surface of the material is lapped or planished to a mirror surface finish, and then is coated with a highly reflective material such as aluminum through the aid of a vacuum evaporation technique, to have high reflectivity. Further, the mirror surface is coated with a transparent protective film made of SiO or $SiO_2$. The SiO and $SiO_2$ films can be formed by vacuum evaporation or sputtering, but are inferior in workability and small in growth rate. Accordingly, it is difficult to form a thick film of SiO and $SiO_2$. In many cases, the protective film is formed of the SiO film since SiO vaporizes at relatively low temperature. However, the SiO film absorbs light a little. Accordingly, when the thickness of the SiO film is made large, the reflectance of the reflecting mirror coated with the SiO film is decreased. On the other hand, when the $SiO_2$ film is formed by sputtering fine particles of SiO are often mixed into the $SiO_2$ matrix. When a ratio of the amount of SiO to that of $SiO_2$ is increased, the $SiO_2$ film absorbs light, and the reflectance of the reflecting mirror coated with the $SiO_2$ film is decreased. For this reason, the transparent protective film of a conventional reflecting mirror has been formed of a very thin SiO or $SiO_2$ film having a thickness of about 200 to 300 Å Accordingly, the mechanical strength of the protective film is small. Further, the reflectance of such a mirror cannot be increased to a reasonable value.

FIG. 1 shows a relation between the thickness of a protective film and the reflectance of a mirror coated with the protective film, in the case where a formula $n_0 < n < n_M$ is satisfied (where $n_M$, n and $n_0$ indicate the refractive indices of the mirror, protective film and an outer medium, respectively). Further, in FIG. 1, reference character R designates the reflectance of the mirror coated with the protective film, nd the optical thickness of the protective film, and $R_0$ the reflectance of the mirror surface having no protective film. As is well known, the reflectance R varies periodically with the optical thickness nd, that is, varies in a range between a maximum value and a minimum value, as indicated by a curve 1. The conventional transparent protective film has a thickness of 200 to 300 Å, that is, the thickness of the conventional film is put in a thickness range 2 shown in FIG. 1. Accordingly, the reflectance of the conventional mirror lies in a reflectance range $R_1$, namely, is lower than the reflectance $R_0$, and moreover decreases with increasing optical thickness of protective film. In other words, the thickness of the conventional protective film is put in the range 2 where the reflectance of the mirror is lower than $R_0$, to enhance the mechanical strength of the protective film.

Further, in the case where light reflected from a mirror coated with a transparent protective film is caused to perform a scanning operation, the intensity of scanning light varies greatly with the incident angle of light impinging on the protective film, when the protective film is thick, because the optical interference caused by the transparent protective film varies with the above-mentioned incident angle. Accordingly, the protective film cannot be made thick.

An object of the present invention is to provide a light-beam scanning apparatus in which light is incident upon a vibrating or rotating mirror having a reflecting metal surface and a transparent protective film so that the angle of incident light varies in a range from 0° to 70° to cause light reflected from the mirror to perform a scanning operation, and in which the light reflectance of the reflecting metal surface is maintained without being reduced by the protective film even when the thickness is large and moreover the intensity of the scanning light is kept substantially constant in a scanning range, by making use of the optical interference caused by the transparent protective film and the reflection characteristic of the reflecting metal surface.

In order to attain the above object, a light-beam scanning apparatus according to the present invention is fabricated on the basis of a principle mentioned below. In the case where a mirror surface is formed by cutting an aluminum alloy, it is required to coat the mirror surface with a protective film which is greater in mechanical strength than the conventional protective film, since the aluminum alloy is a relatively soft material. A hard, transparent film having a desired thickness can be formed on the aluminum alloy by anodic oxidation, and thus a protective film having a satisfactory mechanical strength is obtained. When light is deflected using a reflecting mirror coated with a transparent protective film so as to perform a scanning operation, the incident angle of light impinging on the protective film varies periodically, and the reflectance of the mirror also varies on the basis of the optical interference caused by the transparent protective film. Further, when light is deflected by the mirror surface of a metal such as aluminum so as to perform a scanning operation, the reflectance of the mirror surface for the S-polarized light (namely, the light having the plane of vibration perpendicular to the plane of incidence) increases with increasing incident angle of incident light, and the reflectance of the mirror surface for the P-polarized light (namely, the light having the plane of vibration parallel to the plane of incidence) decreases with increasing incident angle of incident light till the incident angle reaches a predetermined value and then increases with increasing incident angle.

As can be seen from the above, by combining the interference characteristic of a thin film depending upon the incident angle, with the reflection characteristic of metal surface for polarized light, a light-beam scanning apparatus can be formed which produces a scanning light beam having a uniform intensity in a scanning range.

The present invention will be apparent from the following detailed description taken in conjunction with the accompanying drawings, in which.

Figure 2:
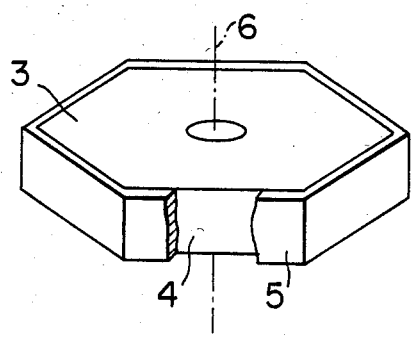
FIG. 2 is a partially cutaway view in perspective of a rotating polygonal mirror according to the present invention.

Now, the present invention will be explained below, on the basis of an embodiment thereof. FIG. 2 is a partially cutaway view in perspective of a rotating polygonal mirror according to the present invention which reflects a scanning light beam in a laser printer. Referring to FIG. 2, the polygonal mirror includes a rotating mirror body 3, a reflecting surface 4 and a protective film 5 for protecting the reflecting surface 4, and turns around a rotating axis 6 to deflect a laser beam which is incident upon the reflecting surface through the protective film 5, thereby scanning a printing surface with a laser beam.

The rotating polygonal mirror 3 is made of a high-purity aluminum-magnesium alloy, and the reflecting surface 4 is formed by the very fine cutting process using a diamond tool to a mirror surface finish. The reflecting surface 4 thus obtained is an optical surface showing the high-reflectivity characteristic of the Al-Mg alloy, but it is required to coat the reflecting surface 4 with a hard, optically transparent protective film since the Al-Mg alloy is small in hardness. An aluminum oxide film formed by anodic oxidation is used as the protective film.

When the high-purity Al-Mg alloy is subjected to the anodic oxidation using sulfuric acid as an electrolyte, a transparent aluminum oxide film is grown on the surface of the Al-Mg alloy. The aluminum oxide film thus grown is excellent in optical characteristics and large in hardness. Accordingly, the film can act as an excellent protective film. Moreover, it is easy to form an aluminum oxide film with desired thickness.

Figure 1:
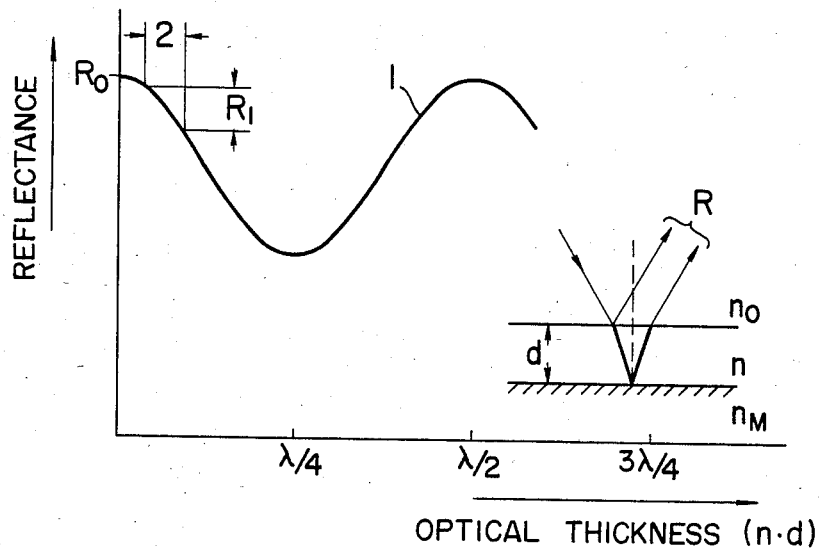
FIG. 1 is a view for explaining a relation between the optical thickness of protective film and the reflectance of a mirror.

Next, a relation between the thickness of a thin, monolayer film and the reflectance of a mirror in the case where a reflecting metal surface is coated with a thin film having a single layer, will be explained with reference to FIG. 1. FIG. 1 shows a reflection characteristic obtained when light impinges on the film in a direction substantially perpendicular thereto. Referring to FIG. 1, in the case where the surface of a metal having a refractive index $n_M$ is coated with a transparent film having a refractive index n smaller than $n_M$, the transparent film is exposed to air having a refractive index $n_0$ (where $n_0 < n < n_M$) and light is incident at an angle of 0° on the transparent film, the reflectance of the mirror varies with the optical thickness nd of the transparent film (where d is the thickness of the film), as indicated by a reflection characteristic curve 1. That is, the reflectance has the largest value at a film thickness of zero, decreases with increasing film thickness, and reaches a minimum value at an optical thickness of $m\lambda/4$ where $m = 1, 2, 3 \ldots$ Then, the reflectance increases with increasing film thickness, and reaches a maximum value at an optical thickness of $m\lambda/2$. Thus, the reflectance has a minimum value when the optical thickness nd becomes equal to $m\lambda/4$, and has a maximum value when the optical thickness nd is equal to $m\lambda/2$ (where $\lambda$ indicates the wavelength of incident light, and m is a positive integer).

The above minimum and maximum values are determined by the refractive indices of the metal and transparent film and the thickness of the protective film. The maximum values of reflectance obtained when the optical thickness of transparent film is equal to $m\lambda/2$, become equal to the reflectance $R_0$ for the optical thickness of zero, if light can pass through the transparent film without any loss. The minimum values of reflectance are obtained when the optical thickness of transparent film is equal to $m\lambda/4$, and the absolute value of the reflectance is determined by the above-mentioned refractive indices.

The reflectance of a mirror fabricated in such a manner that the reflecting surface of an Al-Mg alloy is subjected to anodic oxidation, has been measured. In the case where light is incident at an angle of 0° on the mirror, the reflectance of mirror is equal to 87% when no oxide film is formed, and is decreased to a minimum value (namely, about 70%) when an oxide film having an optical thickness of $m\lambda/4$ is formed on the reflecting surface. Further, the reflectance is increased to a maximum value (substantially equal to 87%) when an oxide film having an optical thickness of $m\lambda/2$ is formed. Thus, it has been revealed that the protective film formed by anodic oxidation, scarcely absorbing light, has a mechanical strength sufficient to protect the reflecting metal surface, and can be grown to an optical thickness equal to or more than $\lambda/2$.

A conventional protective film has the thickness within the range 2, and therefore, the reflectance of mirror lies within the range $R_1$ shown in FIG. 1. On the other hand, a protective film according to the present invention has a thickness of $\lambda/2$ to the high reflectance of the metal itself.

In the above description, explanation has been made of the relfection characteristic of a reflecting mirror in the case where the angle of incidence is kept constant. When a reflecting mirror coated with a protective film vibrates or rotates to provide scanning light, the intensity of the scanning light varies with the incident angle of light impinging on the protective film, on the basis of two factors. These factors have hitherto been considered to prevent satisfactory scanning light from being produced. However, as mentioned above, it is possible nowadays to form a protective film of a desired thickness, these factors can be utilized to fabricate a favorable mirror, as will be mentioned later. Now, the above factors will be explained below in detail.

Figure 3:
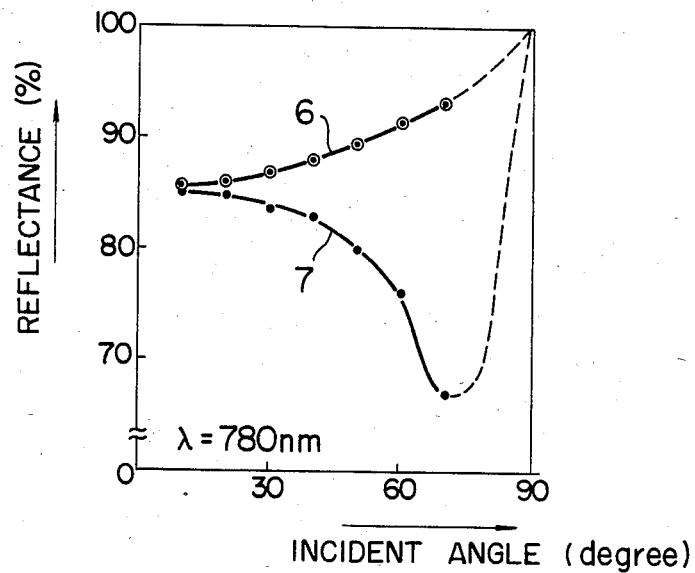
FIG. 3 is a graph showing the reflection characteristic of a metal surface for S- and P-polarized light.

FIG. 3 shows the relation between the incident angle of light impinging on the mirror surface of the Al-Mg alloy and the reflectance of the mirror surface which were obtained by measurements. The measurements were made in a range of incident angle from 10° to 70°, and broken lines in the range of higher degree in FIG. 3 indicate extrapolated values. In FIG. 3, a characteristic curve 6 indicates the reflection characteristic for S-polarized light, and the reflectance of the mirror surface (namely, the reflecting surface) for S-polarized light increases with increasing incident angle.

A characteristic curve 7 shown in FIG. 3 indicates the reflection characteristic for P-polarized light. The reflectance of the reflecting surface for P-polarized light decreases with increasing incident angle so as to reach a minimum value at an incident angle of about 70°, and then increases with increasing incident angle. In the case where the plane of vibration of linearly-polarized, incident light is not parallel nor perpendicular to the plane of incidence, the reflectance lies in a range bounded by the curves 6 and 7. As can be seen from the above, when linearly-polarized light is deflected by a reflecting mirror made of a metal so as to form scanning light, the intensity of the scanning light varies with scanning angle.

In the case where light is deflected using a reflecting mirror coated with a transparent protective film so as to form scanning light, in addition to the above reflection characteristic of the metal surface, the optical interference caused by the protective film varies with the incident angle of light impinging on the protective film and therefore the reflectance varies with incident angle on the basis of the variations in optical interference.

Figure 4:
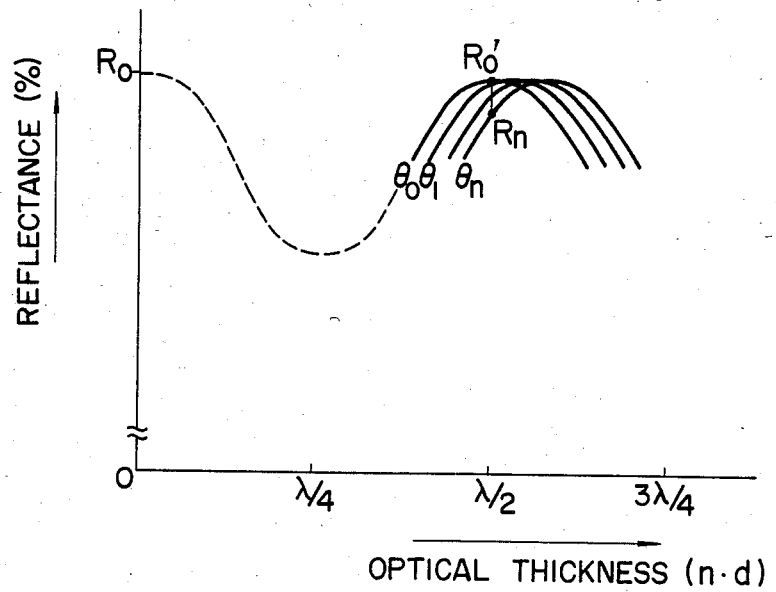
FIG. 4 is a graph showing relations between the optical thickness of protective film and the reflectance of a mirror for various incident angles.

FIG. 4 is a graph for explaining reflection characteristics of a thin film for various incident angles. An increase of the incident angle of light impinging on a thin film is equivalent to a diminution of the thickness of the thin film, and therefore a maximum value of reflectance is shifted to a region where the optical thickness has larger values. Referring to FIG. 4, when light is incident on a thin film in a direction perpendicular thereto, a reflection characteristic curve $\theta_0$ in a film thickness range where the optical thickness of thin film lies in the vicinity of $\lambda/2$, has a maximum value $R_0'$. The reflection characteristic curve $\theta_0$ is changed to a curve $\theta_n$, when the incident angle is increased. Accordingly, when the incident angle of light impinging on a thin film having an optical thickness of $\lambda/2$ is increased from zero, the reflectance is decreased from $R_0'$ to $R_n$. When such a reflection characteristic of thin film is combined with the reflection characteristic of the metal surface for S-polarized light, that is, the characteristic that the reflectance increases with increasing incident angle, these reflection characteristics cancel each other, and thus the intensity of reflected light is kept constant in a scanning range without being affected by changes in incident angle.

In order to reflect scanning light from a mirror at high reflectance, S-polarized light is incident on the transparent film of the mirror, and the thickness of the transparent film at an incident angle corresponding to the beginning of each scanning operation is made equal to $m\lambda/2$. However, the productivity of mirror will be reduced if the mirror is fabricated so that the thickness of the transparent film becomes exactly equal to a desired value. Accordingly, the transparent film is formed so that the thickness thereof lies in an allowable range, and the plane of vibration of linearly-polarized light incident on the transparent film is rotated from the plane of incidence through an appropriate angle in accordance with the thickness of the transparent film so that the intensity of light reflected from the mirror is kept constant in a scanning range.

Figure 5A:
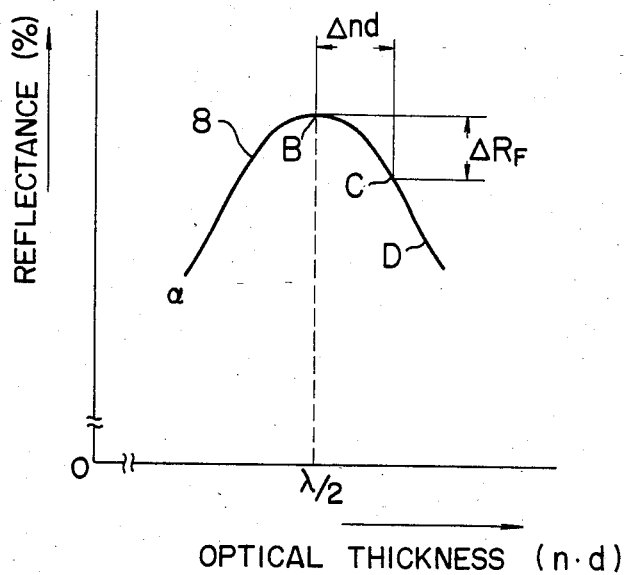
FIGS. 5a and 5b are views for explaining the reflection characteristic of a mirror coated with a protective film.
Figure 5B:
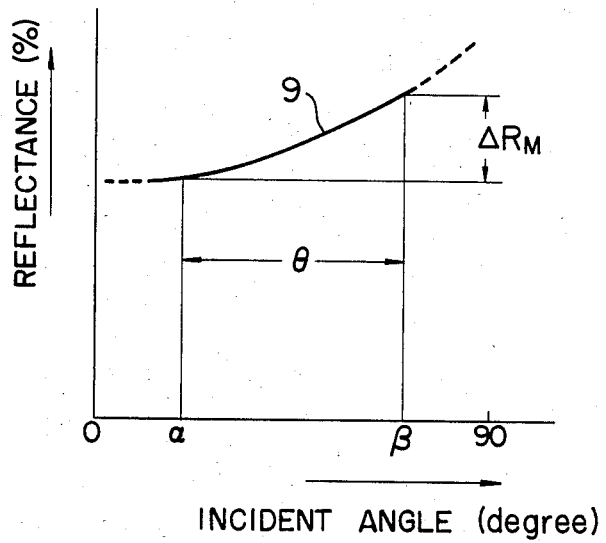

A permissible range of the thickness of protective film will be explained, with reference to FIGS. 5a and 5b. A curve 8 shown in FIG. 5a indicates the reflection characteristic of a protective film at an incident angle $\alpha$. A curve 9 shown in FIG. 5b indicates the reflection characteristic of a metal surface for S-polarized light in an incident angle range from the angle $\alpha$ to an angle $\beta$, and the reflectance is increased by $\Delta R_M$ when the incident angle is increased from $\alpha$ to $\mu$. If a decrease $\Delta R_F$ in reflectance caused by substituting a protective film having an optical thickness of $\lambda/2+\Delta nd$ for a protective film having an optical thickness of $\lambda/2$ is not greater than $\Delta R_M$, scanning light would be kept substantially constant. That is, the optical thickness of the coated protection film may be allowed to vary between $\lambda/2$ and $(\lambda/2+\Delta nd)$. By appropriately setting the direction of vibration of linearly-polarized light incident upon the protective film, a flat characteristic of intensity of the reflected polarized scanning light is obtained.

In the case where a protective film is grown on the mirror surface of the Al-Mg alloy by the anodic oxidation using sulfuric acid as an electrolyte, variations in reflectance can be made less than 1% in a range of incident angle from 10° to 70°, by inclining the plane of vibration of linearly-polarized incident light at an angle of about $+45°$ to $-45°$ to the plane of vibration of S-polarized light.

Figure 6A:
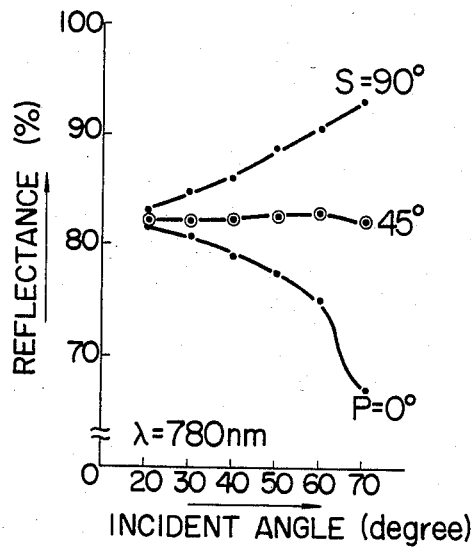
FIGS. 6a to 6d are graphs showing relations between the incident angle of light and the reflectance of a mirror for various values of the optical thickness of protective film.
Figure 6B:
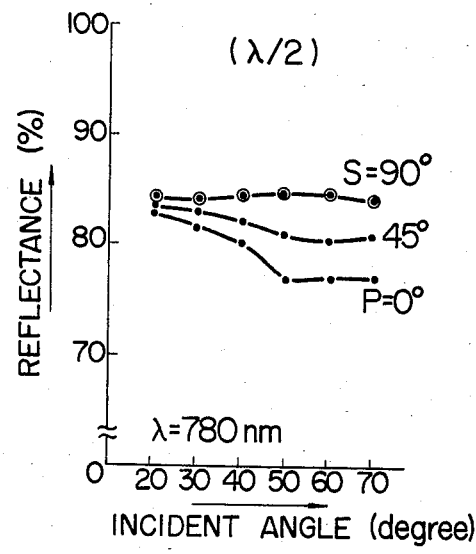
Figure 6C:
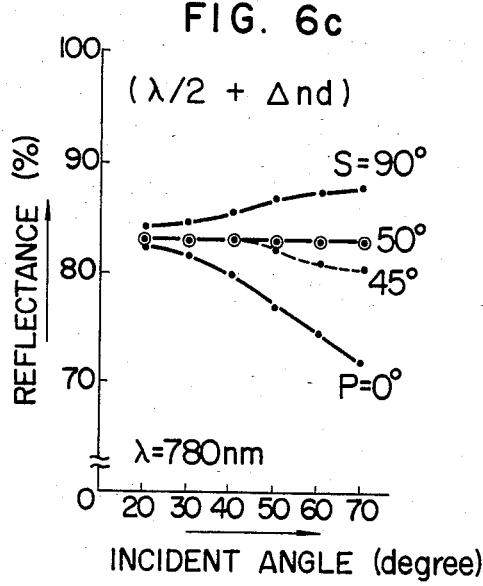

FIGS. 6a to 6d show relations between incident angle and reflectance which were obtained by measurements. In these figures, a numerical value mentioned on the right side of each curve indicates an angle between the direction of vibration of linearly-polarized incident light and the direction of vibration of P-polarized light. The reflection characteristic of a conventional reflecting mirror is shown in FIG. 6a for reference. This reflecting mirror is fabricated in such a manner that an $SiO_2$ film is deposited on the mirror surface of evaporated aluminum to a thickness of 200 to 300 Å, and is rather low in reflectance. Each of FIGS. 6b and 6c shows the reflection characteristic of a reflecting mirror according to the present invention. FIG. 6b shows the characteristic of a reflecting mirror coated with a protective film having an optical thickness of about $\lambda/2$, and FIG. 6c shows the characteristic of a reflecting mirror coated with a protective film having an optical thickness nearly equal to $(\lambda/2+\Delta nd)/n$ For example, when $\lambda/2=3900$ Å and $n=1.6$, then $d=2400$ Å.

Figure 6D:
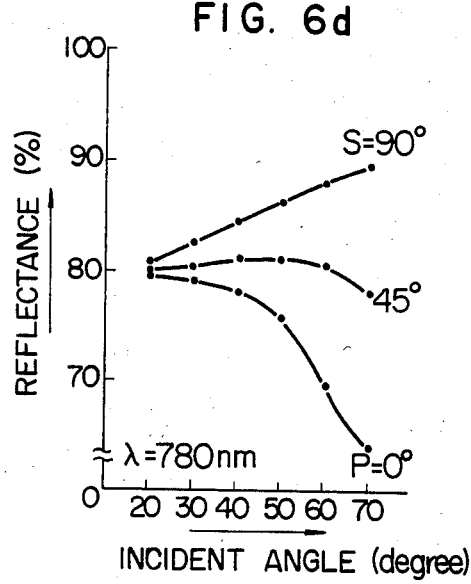

When $\Delta nd=\lambda/16=490$ Å and $n=1.6$, then $\Delta d\approx300$ Å $(\lambda/2+\Delta nd)n\approx2700$ Å. As can be seen from FIGS. 6b and 6c, the linearly-polarized light can be reflected from a reflecting mirror at high reflectance, by appropriately selecting the thickness of a protective film, the incident angle of linearly-polarized light impinging on the protective film, and the direction of vibration of the linearly-polarized light. FIG. 6d shows the reflection characteristic of a reflecting mirror coated with a protective film having an optical thickness exceeding the permissible range. The reflectance of the reflecting mirror is rather low and moreover a range of incident angle where the reflectance is kept constant, is rather narrow, as shown in FIG. 6d.

In the foregoing description, explanation has been made on the case where the surface of an Al-Mg alloy is finished to a mirror surface and then an oxide film is grown on the mirror surface by anodic oxidation. The present invention is not limited to such a case, but can produce a similar effect in the case where the mirror surface of other metals such as silver and copper is coated with a transparent film such as an SiO film, $SiO_2$ film, or plastic film.

According to the present invention, it is possible to use a protective film having an optical thickness nearly equal to $m\lambda/2$, and the intensity of scanning light can be made substantially uniform in a scanning range without reducing the high reflectivity of a metal surface. Further, a protective film can be made larger in thickness than a conventional protective film, and therefore can be made high in mechanical strength. Accordingly, the protective film can sufficiently protect the reflecting metal surface. Thus, a reflecting mirror coated with such a protective film is easy to handle, and the life thereof increases.

A reflecting mirror having a reflecting surface made of an aluminum alloy is low in cost, since the reflecting surface can be formed by finishing a cut surface of the aluminum alloy to a mirror surface. Further, a protective film can be formed on the mirror surface by anodic oxidation. That is, an optically high-quality protective film can be readily formed. Thus, a high-performance reflecting mirror or optical reflector can be fabricated at low cost.

We claim:

1. A light-beam scanning apparatus comprising:
   a reflecting surface made of a metal and having a characteristic that the reflectance of said reflecting surface increases as the incident angle of light incident on said reflecting surface is larger, said incident light being linearly-polarized light, the direction of vibration of said linearly-polarized light being inclined at an angle of about +45° to −45° to a direction perpendicular to the plane of incidence of said linearly-polarized light;
   a transparent protective film formed on said reflecting surface and having an optical thickness nd substantially equal to mλ/2 (where n, d, m, and λ indicate the refractive index of said transparent protective film, the thickness of said transparent film, an integer, and the wavelength of said incident light, respectively); and
   means for deflecting said reflecting surface, the incident angle of said light incident on said transparent protective film being varied in an angular range less than 70°, to provide scanning light so that the intensity of light reflected from said reflecting surface is maintained substantially constant in a scanning range.

2. A light-beam scanning apparatus according to claim 1, wherein said transparent protective film is an oxide film which is formed on said metal by anodic oxidation.

3. A light-beam scanning apparatus according to claim 2, wherein said metal is an aluminum-magnesium alloy.

4. A light-beam scanning apparatus comprising:
   a mirror with a reflecting surface made of metal for reflecting a light incident at an incident angle of not more than 70°,
   an anodic oxide film formed on said reflecting surface and having an optical thickness n d substantially equal to mλ/2 (wherein n, d, m, λ indicate the refractive index of said oxide film, the thickness of said oxide film a positive integer, and the wavelength of said incident light, respectively), and
   means for deflecting said reflecting surface, said incident light being near polarized light and the direction of vibration of said linear polarized light being inclined at an angle of about +40° to −40° to a direction perpendicular to the plane of incidence of said linear polarized light in response to the thickness of said oxide film so that the intensity of light reflected from said reflecting surface is maintained substantially constant in a scanning range.

5. A light-beam scanning apparatus according to claim 5, wherein said metal is aluminum-magnesium alloy.

6. A light-beam scanning apparatus according to claim 5, wherein said mirror is a rotating polygonal mirror.

7. A light-beam scanning apparatus according to claim 5, wherein said reflecting surface has a fine mirror surface obtained by a very fine cutting using a diamond tool.

8. A light-beam scanning apparatus according to claim 5, wherein said anodic oxide film is formed by growing aluminum oxide from said fine mirror surface of Al-Mg alloy using sulfuric acid as an electrolyte.

9. A light-beam scanning apparatus according to claim 5, wherein said direction of vibration of said linear polarized light is inclined at an angle of about +40° to +45° or −40° to −45° to the direction perpendicular to the plane of incidence of said linear polarized light in response to the thickness of said oxide film.

10. A light-beam scanning apparatus comprising:
    a rotating polygonal mirror with a plurality of reflecting surfaces made of metal for reflecting a light incident at an incident angle of not more than 70°,
    an anodic oxide film formed on said reflecting surface and having an optical thickness n d substantially equal to mλ/2 ( where n, d, m, λ indicate the refractive index of said oxide film, the thickness of said oxide film, a positive integer, and the wavelength of said incident light, respectively), and
    means for deflecting said reflecting surface, said incident light being linear polarized light and the direction of vibration of said linear polarized light being inclined at an angle of about +40° to −40° to a direction perpendicular to the plane of incidence of said linear polarized light in response to the thickness of said oxide film so that the intensity of light reflected from said reflecting surface is maintained substantially constant in a scanning range.

11. A light-beam scanning apparatus according to claim 10, wherein said metal is aluminum-magnesium alloy.

12. A light-beam scanning apparatus according to claim 11, wherein said reflecting surface has a fine mirror surface obtained by a very fine cutting using a diamond tool.

13. A light-beam scanning apparatus according to claim 12, wherein said anodic oxide film is formed by growing aluminum oxide from said film mirror surface of said Al-Mg alloy using sulfuric acid as an electrolyte.

14. A light-beam scanning apparatus according to claim 11, wherein said direction of vibration of said linear polarized light is inclined at an angle of about +40° to +45° or −40° to −45° to the direction perpendicular to the plane of incidence of said linear polarized light in response to the thickness of said oxide film.

15. A light-beam scanning apparatus of a laser printer for providing substantially constant beam intensity of a scanning light for various angles of incidence, comprising:
    a mirror with a reflecting surface made of metal for reflecting a light-beam incident at an incident angle of not more than 70°,
    an anodic oxide film formed on said reflecting surface and having an optical thickness n d substantially equal to mλ/2 (wherein n, d, m, λ indicate the refractive index of said oxide film, the thickness of said oxide film a positive integer, and the wavelength of said incident light, respectively), and
    means for deflecting said reflecting surface, said incident light being linear polarized light and the direction of vibration of said linear polarized light being inclined at an angle of about +40° to −40° to a direction perpendicular to the palen of incidence of said linear polarized light in response to the thickness of said oxide film so that the intensity of light reflected from said reflecting surface is maintained substantially constant in a scanning range.

16. A light-beam scanning apparatus of a laser printer according to claim 15, wherein said metal is aluminum-magnesium alloy.

17. A light-beam scanning apparatus of a laser printer according to claim 16, wherein said reflecting surface has a fine mirror surface obtained by a very fine cutting using a diamond tool.

18. A light-beam scanning apparatus according to claim 15, wherein said mirror is a rotating polygonal mirror.

19. A light-beam scanning apparatus of a laser printer according to claim 15, wherein said anodic oxide film is formed by growing aluminum oxide from said fine mirror surface of said aluminum-magnesium alloy using sulfuric acid as an electrolyte.

20. A light-beam scanning apparatus of a laser printer according to claim 15, wherein said direction of vibration of said linear polarized light is inclined at an angle of about $+40°$ to $+45°$ or $-40°$ to $-45°$ to the direction perpendicular to the plane of incidence of said linear polarized light in response to the thickness of said oxide film.

* * * * *